United States Patent [19]

Aikawa et al.

[11] 3,895,081

[45] July 15, 1975

[54] TACKIFYING RESIN AND METHOD FOR MANUFACTURE THEREOF

[75] Inventors: Teiichi Aikawa, Nara-ken; Isao Shiihara, Osaka, both of Japan

[73] Assignee: Agency of Industrial Science & Technology, Tokyo, Japan

[22] Filed: Oct. 26, 1972

[21] Appl. No.: 300,918

[30] Foreign Application Priority Data
Oct. 26, 1971   Japan................................ 46-85339

[52] U.S. Cl. ........... 260/82.1; 260/78.4 D; 260/734; 260/739; 260/744; 260/879; 260/94.3
[51] Int. Cl............. C08d 304; C08d 306; C08d 310
[58] Field of Search........................... 260/82.1, 93.1

[56] References Cited

UNITED STATES PATENTS

| | | | |
|---|---|---|---|
| 3,066,123 | 11/1962 | Strohmayer et al. | 260/93.1 |
| 3,299,170 | 1/1967 | Gonzenbach | 260/93.3 X |
| 3,387,046 | 6/1968 | Cleary | 260/93.1 X |
| 3,624,060 | 11/1971 | Judy | 260/82.1 X |
| 3,707,520 | 12/1972 | Pampus et al. | 260/82.1 X |
| 3,778,420 | 12/1973 | Brown et al. | 260/82.1 X |

*Primary Examiner*—William F. Hamrock
*Attorney, Agent, or Firm*—Kurt Kelman

[57] ABSTRACT

Disclosed is a tackifying resin which is produced by polymerizing an oligomer of isoprene, isoprene-butadiene or isoprene-1,3-pentadiene using a metal halide as a catalyst.

6 Claims, No Drawings

TACKIFYING RESIN AND METHOD FOR MANUFACTURE THEREOF

This invention relates to a tackifying resin and method for the manufacture thereof.

The tackifying resin is resin of such kind that, when it is incorporated into such substrate as rubber, polyolefin, polyvinyl acetate, polyamide, polyester or the like, it confers tackiness and adhesiveness upon the substrate. It is used as pressure sensitive adhesive or hot-melt adhesive agent in adhesive tapes, labels, seals, etc., incorporated into printing inks, paints, waxes, etc., and employed in paper processing, unvulcanized synthetic rubber molding and so on. Of these various applications, the application directed to the preparation of adhesive tapes, seals and the like requires the tackifying resin to possess a particularly high initial tackifying property.

Polyterpene resins and rosin-based resins have heretofore been employed extensively as such tackifying resins. These resins are derived mostly from the pine-wood or essential oil thereof. Thus, the total output of these resins is automatically limited. On the other hand, the demand for tackifying resins is increasing sharply. To satisfy the increased demand, therefore, various related industries are emphasizing the need for developing synthetic substitutes for these natural products.

Generally, when tackifying resins are used in the preparation of adhesive tapes, seals and the like, the three properties, namely initial tackifying property, adhesive strength and cohesive strength are considered to constitute important factors. Of the tackifying resins heretofore known to the art, polyterpene resins and rosin-based resins exhibit excellent initial tackifying property but inferior cohesive strength. For this reason, adhesive tapes prepared by using such resins have a disadvantage that the adhesive agent oozes out from under the edges of tapes after the tapes have been applied to surfaces as required. The tackifying resins of petrolic raw materials hetetofore developed show satisfactory cohesive strength but have an inferior initial tackifying property to that of polyterpene resins or rosin-based resins. With the exception of hydrogenated ones and consequently expensive resins, these resins of petrolic origin have been used in a limited range of applications because of their disagreeable hue.

The main object of the present invention is to provide, from such raw materials as isoprene, butadiene and 1, 3-pentadiene (piperylene) which are produced abundantly and inexpensively as petrochemical intermediates, tackifying resins having the three tackifying properties well balanced with one another and particularly excelling in initial tackifying property, cohesive strength and excel in a hue and a method for the manufacture thereof.

Another object of this invention is to provide tackifying resins which are sparingly weight loss and coloring upon exposure to heat and permit use as hot-melt pressure sensitive adhesive.

It is still another object of this invention to provide, for all the applications currently involving the use of polyterpene resins, rosin-based resins or aliphatic petroleum resins, inexpensive tackifying resins which possess novel properties and therefore can serve as substitutes for the said conventional resins and overcome the drawbacks accompanying by the conventional resins.

The inventors pursued studies in search for a method which is capable of producing tackifying resins by using, as raw materials, hydrocarbons derived abundantly from naphtha cracking in place of naturally occurring terpenes. They have directed special notice to the observation that the cyclic oligomer produced by the oligomerization of isoprene or the cyclic cooligomer produced by the co-oligomerization of isoprene and butadiene or isoprene and 1,3-pentadiene has a chemical structure strikingly similar to that of cyclic monoterpenes. The present invention has been accomplished on the basis of this knowledge.

The tackifying resin contemplated by this invention is obtained by oligomerizing isoprene alone, or isoprene and butadiene or isoprene and 1,3-pentadiene respectively in combination by an ordinary procedure to produce the cyclic oligomer of isoprene, the co-dimer of isoprene and butadiene or the co-dimer of isoprene and 1,3-pentadiene and subsequently polymerizing the resultant oligomer in the presence of a specific catalyst.

First, an explanation is given to the oligomerization of isoprene alone. In the oligomerization of isoprene by an ordinary procedure such as J. L. Binder et al's published in Journal Polymer Sci., 38, 229 (1959), C. Walling et al's in Journal Am. Chem. Soc., 80, 5819 (1958) or I. Nazarov et al's in Zhur. obshchei Khim. 25, 291 (1955), for example, there is produced a mixture comprising 20 – 40% of 1,4-dimethyl-4-vinyl-1-cyclohexene, 20 – 40% of 2-methyl-4-isopropenyl-1-cyclohexane, 20 – 40% of 1-methyl-4-isopropenyl-1-cyclohexane, 5 – 10% of 1,5-dimethyl-1,5-cyclooctadiene plus 2,5-dimethyl-1,5-cyclooctadiene, and 1 – 3% of trans-1,2-dimethyl-1,2-divinyl-cyclobutane, trans-isopropenyl-2-methyl-2-vinylcylcobutane plus trans-1,2-diisopropenyl-cyclobutane.

When isoprene and butadiene are oligomerized by an ordinary procedure such as R. A. W. Johnstone et al's published in Journal Chem. Soc., 935 (1963), for example, there is obtained a mixture which predominantly comprises 40 – 60% of such co-dimers as 1-methyl-1,2-divinylcyclobutane, 4-methyl-4-vinylcyclohexene, 1-methyl-4(5)-vinylcyclohexene, 4-isopropenyl-cyclohexene, 1-methyl-cyclooctà-1,5-diene, etc. and 40 – 60% of such homodimers as 1,2-divinylcyclobutane, 1,2-dimethyl-1,2-divinylcyclobutane, 1-isopropenyl-2-methyl-2-vinylcyclobutane, 1,2-diisopropenylcyclobutane, 4-vinylcyclohexene, cycloocta-1,5-diene, 1,4-dimethyl-4-vinylcyclohexene, meta- and para-mentha-1,8-diene, 1,5- and 2,5-dimethyl-cycloocta-1,5-diene, etc.

When isoprene and 1,3-pentadiene are oligomerized at 100°C – 25°C, there is obtained a mixture which comprises 40 – 90% of such isoprene dimers as 1,2-dimethyl-1,2-divinyl-cyclobutane, 1-methyl-1-vinyl-2-isopropenyl cyclobutane, 1,2-diisopropenyl cyclobutane, 1,4-dimethyl-4-vinyl-cyclohex-6-ene, 1-methyl-3-isopropenyl-cyclohex-6-ene, 1-methyl-4-isopropenyl-cyclohex-6-ene, 1,5-dimethyl-1,5-cyclooctadiene, and 2,5-dimethyl-1,5-cyclooctadiene, 5 – 20% of such 1,3-pentadiene dimers as 1-methyl-2-vinyl-3-propenyl-cyclobutane, 1,2-propeyl-cyclobutane, 1,2-dimethyl-3-vinyl-cyclohex-5-ene, 1,3-dimethyl-2-vinyl-cyclohex-5-ene, 1-methyl-2-propeyl-cyclohex-5-ene, 1-methyl-3-propenyl-cyclohex-5-ene, 3,4-dimethyl-1,5-cyclooctadiene, and 2 – 30% of such codimers of isoprene-1,3-pentadiene as 1-methyl-1-vinyl-2-propenyl-cyclobutane, 1-isopropenyl-2-propenyl-cyclobutane, 1,2-dimethyl-3-vinyl-cyclohex-6-ene, 1,3-dimethyl-2-vinyl-cyclohex-6-ene, 1-methyl-3-propenyl-cyclohex-6-ene, 1-methyl-4-propenyl-cyclohex-6-ene, and 1,4-dimethyl-1,5-cyclooctadiene.

Although the percentage composition of the mixture of dimers mentioned above is not specifically limited, the ratio of polymerization is generally improved by increasing the proportion of isopropenyl type dimers in the mixture. From this, it follows that more desirable results are obtained by increasing the proportion of specific components in the said mixture as by using a radical polymerization catalyst or a metal complex catalyst or adopting a method involving photoreaction in carrying out the required dimerization.

For the purpose of the present invention, the mixture of cyclic oligomers obtained as mentioned above may be used in its unmodified form as the starting raw material. Otherwise, specific components contained in the mixture may be separated and put to use. Usually, it is more advantageous to use the mixture in the unaltered form, because separation of components having boiling points in a narrow range in these cases requires much expense and labor.

The polymerization of such cyclic oligomers may be carried out by the bulk polymerization technique. When the removal of reaction heat and the efficiency of agitation are taken into consideration, the polymerization is preferable to be performed in a solvent. The solvents which can be used for the polymerization include aliphatic hydrocarbons such as hexane, heptane and cyclohexane, aromatic hydrocarbons such as benzene, toluene and xylene, and halogenated hydrocarbons such as methylene chloride and ethylene dichloride, for example.

The polymerization may be carried out by using a method whereby the cyclic oligomer mixture is introduced dropwise into a solvent incorporating therein a catalyst or another method whereby a catalyst is gradually incorporated into the mixture of the solvent with the cyclic oligomer mixture. Since the reaction of polymerization entails evolution of heat, it is necessary that the cyclic oligomer mixture or the catalyst should be introduced thereto gradually and piecemeal instead of being added in large quantity all at once.

The catalysts which are usable for the purpose of the present polymerization include those of metal halides such as Friedel-Crafts catalysts and mixed catalysts consisting of organometallic compounds and metal halogenides.

Concrete examples of Friedel-Crafts catalysts include aluminum trichloride, aluminum chloride complexes, aluminum tribromide, boron trifluoride, zirconium chloride, titanium tetrachloride, $AlCl_3$-$FeCl_3$, $AlCl_3$-$TiCl_4$, $AlCl_3$-$AlBr_3$, etc. These catalysts may be used either independently or in suitable combinations.

The organometallic compounds to be used in the aforementioned mixed catalysts in conjunction with metal halogenides include alkyl aluminum compounds represented by the generic formula $RnAlX_{3-n}$ and alkyl tin compounds represented by the generic formula $R_nSnX_{3-n}$ (in the formulas, R represents a hydrocarbon substituent and, in case of two or more occurrences of R, they may represent the same or different hydrocarbon substituents, X denotes a halogen atom and $n$ is 1, 1.5, 2 or 3).

The hydrocarbon substituents which are suitable for the present purpose include alkyl groups, aralkyl groups, aryl groups and alkaryl groups which have up to 18 carbon atoms. The halogens represented by X include chlorine, bromine, iodine, for example.

Concrete examples of organometallic compounds are triethylaluminum, tributylaluminum, dimethylaluminum chloride, diethylaluminum chloride, diethylaluminum bromide, diethylaluminum iodide, diisobutylaluminum chloride, dihexylaluminum chloride, diisobutylaluminum bromide, methylaluminum sesquichloride, ethylaluminum sesquichloride, ethylaluminum sesquibromide, hexylaluminum sesquichloride, ethylaluminum dichloride, ethylaluminum dibromide, isobutylaluminum dichloride, etc.

The metal halides required to be present in the aforementioned mixed catalysts are the halides of the metals belonging to Groups III, IV, V, VI and VIII of the Periodic Table of Elements.

Concrete examples of metal halides include anhydrous aluminum chloride, anhydrous stannic chloride, titanium tetrachloride, titanium trichloride, zirconium tetrachloride, vanadium tetrachloride, vanadium trichloride, vanadium oxytrichloride, molybdenum pentachloride, tungsten hexachloride, ferric chloride, nickelous chloride, cobalt chloride, etc.

The concentration of catalyst is desired to fall in the range of 1 – 10% by weight based on the cyclic oligomers present. The ratio of polymerization is not sufficiently high where the catalyst concentration fails to reach the lower limit. The catalyst, if used at a concentration beyond the upper limit, causes coloration in the resultant polymer and proves to be uneconomical. No particularly rigid limits are placed on reaction temperature and reaction time. The reaction satisfactorily proceeds under conditions of $-20° - 80°C$ and 1 – 7 hours. In consideration of the economy of operation, the convenience of temperature control and other factors, the reaction is desired to be carried out at $10°C - 50°C$ with stirring for a period of 1 – 5 hours.

The termination of the polymerization reaction is accomplished by addition of water or methanol or some other suitable alcohol to the reaction system. The reaction mixture thus obtained is first washed with dilute hydrochloric acid, an alkali and water in the order mentioned. The washed mixture is then distilled off the solvent and low-boiling substances by reducedpressure and a resin having a light amber color is given. When this resin is dissolved in toluene or benzene and reprecipitated by the addition of methanol, it gives rise to a white powdery resin.

When the resin thus obtained has resulted from the sole use of isoprene, it has an average molecular weight of 750 – 1,300, a softening point of 74 – 140°C, a specific gravity of 0.968 – 0.996, and a hue of 1 – 5G. In the case of the copolymer resin of isoprene and butadiene, it has a molecular weight of 510 – 960, a sofening point of 65° – 135°C, a specific gravity of 0.970 – 0.998 and a hue of 1 – 7G. In the case of the copolymer resin of isoprene and 1,3-pentadiene, it has a molecular weight of 730 – 930, a softening point of 89° – 118°C, a specific gravity of 0.969 – 0.997 and a hue of 1 – 6G.

In the infrared absorption spectra of these resins, a strong vinyl group absorption which is not observed in those of the conventional terpene type resins is found separately at 907 and 996 $cm^{-1}$. A study by gas partition chromatography reveals these resins to possess an entirely new structure showing two peaks, one at 1,100 - 1,200 and another at 750 - 800 of molecular weight distribution curves.

These resins show extremely high compatibility with natural rubbers and synthetic rubbers, possess a hue favorably comparable with that of β-pinene resin which is currently deemed as the best of all natural polyterpene resins, exhibits the three tackifying properties in a well-balanced relationship, and fully satisfyies the requirements to be expected of tackifiers for pressure-sensitive adhesive compositions. Particularly, the resins according to this invention by far exceed commercially available tackifying resins of petrolic origin in terms of initial tackifying property. Their cohesive strength is decidedly superior to that of polyterpene resins or rosin-based resins which are natural products. Thus, the resins of this invention combine the properties of natural resins and those of petrolic resins. Further, they have extremely high compatibility with natural terpene resins or with commercially available petrolic resins. They serve to improve antioxidative property and cohesive strength when they are blended with rosins and used in the preparation of adhesive tapes. They similarly serve the purpose of improving softing point, adhesive strength and cohesive strength when they are blended with polyterpene resins.

In terms of compatibility with ethylene-vinylacetate copolymer and polyamide, the resins of this invention show the similar characteristic as terpene type resins and aliphatic petrolic resins. That is to say, these resins also have desirable properties for use as hot-melt adhesive agents. They excel other commercially available resins particularly in terms of low-temperature properties. For this reason, they can be utilized in packaging materials for frozen food. They also exhibit satisfactory compatibility with polyolefines. When a film is formed by incorporating 10% or more of the resin of this invention, the film has its heat-seal temperature lowered and Young's modulus heightened to the same extent as with terpene type resins. In the case of a film formed by using a polyolefin incorporating an antistatic agent, gradual time-course change and abnormal decline in the coefficient of friction can readily and economically be prevented by incorporating 0.1 - 1.0% by weight of the resin of this invention. Thus, the use of resins of this invention permits these films to retain their original properties unimpaired for a long time in transit or in storage. Another advantage of these resins is that they confer outstanding haze-resisting property on films and they can consequently be used effectively in covers placed over agricultural products for the purpose of protection against dew. The films applying these resins can improve the printingness of ink and minimize their blur. When these resins are caused to combine with maleic anhydride, the products show more desirable sizing effects than those obtainable with commercially available resins of aliphatic petrolic origin. They have satisfactory compatibility with waxes and enable waxes to acquire improved quality in terms of viscosity, rigidity, melting point and the like. In the production of coating materials such as varnishes, enamels and paints, incorporation of suitable amounts of the resins of this invention permits the applied coats to acquire proper degrees of rigidity and gloss and enjoy improvement in drying property, weatherability, waterproofness and alkaliproofness. Gravure inks prepared by blending the resins of this invention with various kinds of pigments show desirable color tones and exhibit improvement in gloss and resistance to friction.

As mentioned above, the resins according to the present invention can be used in the same applications as those found for commercially available petrolic resins as well as for natural terpene type resins and rosin-based resins and can extensively be used as substitutes for such natural resins.

The present invention will be described hereinafter with reference to preferred embodiments and comparative tests. The preferred embodiments are illustrative of the present invention and are not to be considered as limitative thereof in any way.

EXAMPLE 1

A four-neck flask fitted with a stirrer, a thermometer and a nitrogen gas inlet was charged with 20g of cyclic oligomer of isoprene in the form of a mixture consisting of 29% of 1,4-dimethyl-4-vinyl-1-cyclohexene, 31% of meta-1,8-menthadiene, 34% of para-1,8-menthadiene and 5% of 1,5- and 2,5-dimethyl-1,5-cyclooctadiene, 1% of the mixture of cyclobutanes and 20g of toluene. While the mixture was vigorously stirred under continuous supply of nitrogen, 0.7g of anhydrous aluminum chloride (corresponding to 3.5% by weight based on the combined weight of the monomers) was introduced. In the course of the catalyst's addition, the reactor was maintained at about 30°C by cooling. After the addition of the catalyst, the cooling was discontinued but the stirring was continued. Gradually, the reaction solution became increasingly reddened. At this time, a viscous precipitate began to adhere to the inner wall of the reactor. After two hours of stirring, the reaction product was transferred into a separation funnel and subjected to the full washing with water and alkali by repeated treatments. The oil phase forming the upper layer was moved into a distillation flask, in which it was distilled off solvent and oily component by reduced-pressure. Consequently there was obtained 17g of resin. Calculation shows that the yield of this resin is 85% based on the monomers used.

The resin is found to have a softening point of 127°C as determined by the Ring and Ball Method a molecular weight of 948 (as determined by the cryoscopic method), a specific gravity of 9.996 (as determined according to JIS method) and hue of 1.5 (Gardner Scale).

EXAMPLE 2

Cyclic oligomer of isoprene in the form of a mixture consisting of 10% of 1,4-dimethyl-4-vinyl-1-cyclohexene, 48% of meta-1,8-menthadiene, 38% of para-1,8-menthadiene, 2% of 1,5- and 2,5-dimethyl-1,5-cyclooctadiene and 2% of the mixture of cyclobutanes was polymerized under entirely the same conditions as in Example 1.

Calculation shows that the yield of the resultant resin is 92%. This resin was found to have a softening point of 141°C, a molecular weight of 1176, a specific gravity of 0.996 and a hue of 2.0G.

EXAMPLE 3

In the same reaction apparatus as used in Example 1, 20g of toluene was placed. While under continuous supply of nitrogen, 1g of aluminum chloride was introduced. With the contents of the flask stirred continuously, 20g of cyclic oligomers of isoprene in the form of a mixture consisting of 31% of 1,4-dimethyl-4-vinyl- 1-cyclohexene, 30% of meta-1,8-menthadiene, 33% of para-1,8-menthadiene, 5% of 1,5- and 2,5-dimethyl-1,5-cyclooctadiene and 1% of the mixture of cyclobutane was introduced dropwise over a period of 5 minutes. During this reaction, the reaction system was maintained at 30°C. The reaction was allowed to continue for 2 hours. Then, the reaction product was treated by repeating the procedure of Example 1. Consequently, there was obtained a resin in a yield of 84%.

The resin thus obtained was found to have a softening point of 138°C, a molecular weight of 1063, a specific gravity of 0.979.

EXAMPLE 4

In the same apparatus as used in Example 1, 20g of cyclic oligomers of isoprene having the same composition as that of Example 3 were subjected to polymerization reaction under the varying conditions indicated in Table 1. The results were as shown correspondingly in the same Table.

the same composition as that of Example 1 were introduced dropwise over a period of 2 hours at 30°C. After the termination of reaction, the reaction product was treated by repeating the procedure of Example 1. Consequently, there was obtained 18g of a resin having a softening point of 142°C and a molecular weight of 1295. Calculation shows the yield of this resin to be about 90%.

EXAMPLE 6

In the same apparatus as used in Example 5, the same starting materials were subjected to polymerization reaction under the varying conditions indicated in Table 2. The yields and the softening points of the resultant resins were as shown correspondingly in the same Table. In Run No. 6, the starting raw materials were added after $AlCl_3$ and $TiCl_4$ had been subjected to reaction under heating. In Run No. 7, the starting raw materials were added without carrying out such reaction under heating.

Table 1

| Run No. | Catalyst Kind | Catalyst Weight (%) | Solvent | Polymerization Temperature (°C) | Polymerization Time (hr) | Yield (%) | Resultant Polymer Softening point (°C) | Resultant Polymer Molecular weight | Specific gravity |
|---|---|---|---|---|---|---|---|---|---|
| 1 | $AlCl_3$ | 5 | Xylene | 30 | 2 | 81 | 138 | 1105 | 0.985 |
| 2 | '' | 10 | '' | 30 | 2 | 80 | 140 | 1057 | 0.997 |
| 3 | '' | 5 | Ethylene dichloride | 30 | 2 | 88 | 117 | 759 | 0.968 |
| 4 | '' | 10 | '' | 30 | 2 | 88 | 132 | 944 | 0.989 |
| 5 | $BF_3$ | — | Toluene | −5 | 3 | 78 | 82 | | |
| 6 | '' | — | Ethylene dichloride | −5 | 4 | 87 | 89 | | |
| 7 | $ZrCl_4$ | 5 | Toluene | 30 | 7 | 44 | 91 | | |
| 8 | $AlBr_3$ | 5 | '' | 30 | 2 | 76 | 119 | | |

Table 2

| Run No. | Catalyst composition (mol ratio) | Mixed catalyst consisting of aluminum chloride and metal halide Concentration (%) of $AlCl_3$ based on weight of monomers | Solvent | Polymerization conditions Temperature (°C) | Polymerization conditions Time (hr) | Resultant polymer Yield (%) | Resultant polymer Softening point (°C) |
|---|---|---|---|---|---|---|---|
| 1 | $AlCl_3$ - $FeCl_3$ (1 : 2) | 2.5 | Toluene | 30 | 2 | 68 | 74 |
| 2 | (1 : 1) | 3.75 | '' | '' | '' | 75 | 96 |
| 3 | (2 : 1) | 5 | '' | '' | '' | 90 | 142 |
| 4 | (4 : 1) | 6 | '' | '' | '' | 74 | 116 |
| 5 | $AlCl_3$ - $TiCl_4$ (1 : 10) | 1 | '' | 60 | 4 | 73 | 119 |
| 6 | (2 : 1) | 5 | '' | 30 | 2 | 68 | 124 |
| 7 | (2 : 1) | 5 | '' | '' | '' | 78 | 105 |
| 8 | $AlCl_3$ - $AlBr_3$ (1 : 2) | 5 | '' | '' | '' | 95 | 110 |
| 9 | (1 : 1) | 2.5 | '' | '' | '' | 80 | 132 |
| 10 | $AlCl_3$ - $Bu_2SnCl_2$ (1 : 2) | 5 | Benzene | 40 | 2 | 87 | 111 |
| 11 | (1 : 2) | 7.5 | Hexane | 50 | 1 | 84 | 110 |
| 12 | (2 : 1) | 5 | Benzene | 40 | 2 | 91 | 113 |

EXAMPLE 5

In the same reaction apparatus as used in Example 1, 20g of toluene and 1.0g of a catalyst consisting of 2 mols of anhydrous aluminum chloride and 1 mol of anhydrous ferric chloride were placed. With the contents of the apparatus stirred under continuous current of nitrogen gas, 20g of cyclic oligomers of isoprene having

EXAMPLE 7

In the same apparatus as used in Example 1, 0.59g of anhydrous aluminum chloride and 30g of anhydrous toluene were placed. Then 0.55g of ethylaluminum sesquichloride was added thereto. The resultant mixture was stirred at about 70°C for 60 minutes. The solution which resulted was subsequently cooled to 40°C. Into the cooled solution, 30g of cyclic oligomers of isoprene in the form of a mixture consisting of 34.9% of 1,4-dimethyl-4-vinyl-1-cyclohexene, 23.1% of meta-1,8-menthadiene, 33.1% of para-1,8-menthadiene and 8.9% of 1,5- (and 2,5-)dimethyl-1,5-cyclooctadiene and introduced dropwise over a period of about 15 minutes. The mixture was elevated to 50°C and stirred for 5 hours. Then, the reaction mixture was cooled and the polymerization reaction was terminated by addition of methanol solution of hydrochloric acid.

The reaction mixture was transferred into a separation funnel, washed with hydrochloric acid, an alkali and water in the order mentioned and subjected to reduced-pressure distillation to effect removal of the solvent and unaltered monomers. Consequently, there was obtained 25g (yield 83%) of a light yellow polymer. This polymer has a softening point of 124°C, a molecular weight of 747 and a specific gravity of 0.9934.

EXAMPLE 8

By using the same apparatus and the same starting materials as used in Example 7, the polymerization reaction was carried out under the varying reaction conditions in the presence of varying catalysts, respectively indicated in Table 3. In Runs No. 1 through 5, mixed catalysts composed of alkylaluminum halides and aluminum chloride were used as the catalyst. In Runs No. 6 and 7, alkylaluminum halides were used in unmixed form.

in the presence of varying catalysts, indicated respectively in Table 4. The results obtained were as shown correspondingly in the same Table.

Table 4

| Run No. | Catalyst composition of EtAlCl$_2$ - SnCl$_4$ (mol ratio) | Polymerization conditions Temperature (°C) | Time (hr) | Yield (%) | Softening point (°C) | Molecular weight |
|---|---|---|---|---|---|---|
| 1 | 1 : 2 | 50 | 4 | 74 | 122 | 974 |
| 2 | 1 : 1 | 30 | 3 | 72 | 118 | 790 |
| 3 | 1 : 1 | 50 | 4 | 82 | 119 | 746 |
| 4 | 2 : 1 | 50 | 4 | 91 | 128 | 957 |
| 5 | 4 : 1 | 50 | 4 | 80 | 121 | 997 |

EXAMPLE 10

In a four-neck flask provided with a stirrer, a thermometer, a nitrogen gas inlet and a dropping funnel, there were placed 20g of toluene and 1g of anhydrous aluminum chloride (5% by weight based on the combined weight of monomers). While the contents of the flask were vigorously stirred under continuous supply of nitrogen gas, 20g of a mixture of cyclic co-oligomers, as shown in Table 5, obtained by subjecting butadiene and isoprene to dimerization reaction at a molar ratio of 1:2 at 150°C for 18 hours and having boiling points of 55° – 95°C (60 mmHg) was introduced dropwise. The reaction was allowed to continue at 30°C for 2 hours. At the end of 2 hours' reaction, the polymerization was terminated by the addition of water. The reaction mixture was transferred into a separation funnel, subjected to cycles of washing with water and an alkali. The liquid which formed the upper layer was transferred into a distillation flask, in which it was subjected to reduced-pressure distillation to effect the removal of the solvent and oil components. Consequently, there was obtained 14.5g of a resinous substance. Calculation shows that the yield of this substance is 72.5% based on the combined weight of monomers used. This resin was found to have a softening point of 121°C, a molecular weight of 790, a specific gravity of 1.01 and a hue of 1.5G.

Table 3

| Run | Catalyst composition (mol ratio) | Mol ratio of alkylaluminum halide based on monomers | Solvent | Polymerization conditions Temperature (°C) | Time (hr) | Resultant polymer Yield (%) | Softening point (°C) | Molecular weight |
|---|---|---|---|---|---|---|---|---|
| 1 | (C$_2$H$_5$)$_3$Al$_2$Cl$_3$ - AlCl$_3$ (1 : 1) | 1/100 | Toluene | 50 | 5 | 68 | 106 | 757 |
| 2 | (1 : 2) | 1/100 | " | " | " | 83 | 124 | 747 |
| 3 | (1 : 1) | 1/100 | Heptane | " | 8 | 77 | 75 | |
| 4 | (C$_2$H$_5$)$_2$AlCl - AlCl$_3$ (1 : 1) | 1/100 | Toluene | " | 5 | 65 | 115 | 869 |
| 5 | (C$_2$H$_5$)AlCl$_2$ - AlCl$_3$ (1 : 2) | 2/100 | Benzene | " | " | 82 | 113 | 942 |
| 6 | (C$_2$H$_5$)$_3$Al$_2$Cl$_3$ | 2/100 | Toluene | 60 | 20 | 50 | 74 | 545 |
| 7 | (C$_2$H$_5$)AlCl$_2$ | 2/100 | Benzene | 50 | 24 | 65 | 78 | 523 |

EXAMPLE 9

A mixture of cyclic oligomers (consisting of 30% of 1,4-dimethyl-4-vinyl cyclohexene, 34% of m-mentha-1,8-diene, 30% of para-mentha-1,8-diene, and 5% of 1,5- and 2,5-dimethyl-1,5-cyclooctadiene 1% of the mixture of cyclobutanes) obtained by the polymerization of isoprene was polymerized in the same apparatus as used in Example 7 under varying reaction conditions

EXAMPLE 11

By using the same apparatus and the same mixture of cocyclic oligomers as dealt with in Example 10, the polymerization reaction was carried out under the varying reaction conditions in the presence of varying catalysts, indicated respectively in Table 6. The results obtained were as shown correspondingly in the same Table.

Table 5

| Starting material Composition | Example 10 BP:IP=1:2 | Example 12 BP:IP=1:1 | Example 13 BP:IP=2:1 |
|---|---|---|---|
| 1,2-divinylcyclobutane | —(%) | (%) | (%) |
| 1-isopropenyl-2-methyl-2-vinylcyclobutane | 1 | 1 | 2 |
| 1,2-diisopropenyl-cyclobutane | | | |
| 1-methyl-1,2-divinylcyclobutane | 8 | 19 | 38 |
| 4-vinylcyclohexene | 3 | 4 | 4 |
| 4-methyl-4-vinylcyclohexene | 22 | 29 | 23 |
| 1-methyl-4-vinylcyclohexene | 1 | 1 | 2 |
| Cycloocta-1,5-diene | 13 | 14 | 14 |
| 4-isopropenyl cyclohexene | 12 | 6 | 4 |
| 1,4-dimethyl-4-vinyl cyclohexene | 3 | 3 | 4 |
| 1-methyl-cycloocta-1,5-diene | 18 | 10 | 5 |
| 1-methyl-3-isopropenyl cyclohexene | 16 | 10 | 4 |
| 1-methyl-4-isopropenyl cyclohexene | 3 | 2 | — |
| 1,5-dimethyl cycloocta-1,5-diene | | | |
| 1,6-dimethyl cycloocta-1,5-diene | | | — |

Table 6

| Run No. | Catalyst Kind | Catalyst Amount added (g) | Solvent | Polymerization conditions Temperature (°C) | Polymerization conditions Time (hr) | Yield (%) | Softening point (°C) | Molecular weight |
|---|---|---|---|---|---|---|---|---|
| 1 | AlBr$_3$ | 1 | Toluene | 30 | 2 | 62 | 102 | 707 |
| 2 | AlCl$_3$ | 1 | " | 30 | 2 | 70 | 126 | 835 |
| 3 | AlBr$_3$ / ZrCl$_4$ | 0.2 / 1 | " | 40 | 2 | 54 | 65 | 510 |
| 4 | AlCl$_3$ / Bu$_2$SnCl$_2$ | 1 / 0.4 | " | 30 | 2 | 62 | 114 | 643 |

EXAMPLE 12

By following the procedure of Example 10, 20g of a mixture of co-oligomers, as shown in Table 5, obtained by subjecting butadiene and isoprene to dimerization reaction at a molar ratio of 1:1 at 150°C for 18 hours and having boiling points of 55° – 90°C (60 mmHg) was introduced dropwise into 20g of toluene incorporating therein 1g of aluminum chloride. The reaction was allowed to continue at 30°C for 2 hours. After termination of the reaction, the reaction mixture was treated in the same way as in Example 9. Calculation shows that the yield of the resultant resin is 70%. The resin was found to have a softening point of 135°C, a molecular weight of 960, a specific gravity of 0.970 and a hue of 4.5G.

EXAMPLE 13

Co-oligomers, as shown in Table 5, obtained by subjecting butadiene and isoprene to dimerization at a molar ratio of 2:1 at 150°C for 18 hours and having boiling points of 55° – 85°C (60 mmHg) were treated as sole monomers under entirely the same conditions as in Example 10.

Calculation shows that the yield of the resultant resin is 45%. This resin was found to have a softening point of 120°C, a molecular weight of 695, a specific gravity of 0.972 and a hue of 5.5G.

EXAMPLE 14

A four-neck flask fitted with a stirrer, a thermometer, a nitrogen gas inlet and a dropping funnel was thoroughly displaced with dry nitrogen gas. Then, it was charged with 1.15g of tin tetrachloride and 0.56g of ethylaluminum dichloride. The mixture was heated in the presence of a very small amount of a solvent to 40° – 50°C for 45 minutes. Subsequently, 20g of dry benzene was added and stirred. While the mixture was stirred, 30g of a mixture of cyclic co-oligomers of butadiene and isoprene having the same composition as that of Example 10 was introduced dropwise therein. The reaction was allowed to continue with stirring at 50°C for 4 hours. After the four hours' reaction, the reaction mixture was cooled and the polymerization reaction was terminated by the addition of methanol solution of hydrochloric acid. The reaction mixture was transferred to a separation funnel, washed with dilute hydrochloric acid, an alkali and water and then subjected to reduced-pressure distillation to effect the removal of the solvent and unaltered monomers. Consequently, there was obtained 26g (yield 87%) of a resin having a light amber color. This resin was found to have a molecular weight of 734 and a softening point of 132°C.

EXAMPLE 15

The polymerization reaction was carried out by repeating the procedure of Example 14, except that the catalyst composition was varied as indicated in Table 7. The results obtained were as shown correspondingly in the same Table.

Table 7

| Run No. | Catalyst | Yield of polymer (%) |
|---|---|---|
| 1 | EtAlCl$_2$ - TiCl$_4$ | 69 |
| 2 | EtAlCl$_2$ - ZrCl$_4$ | 63 |
| 3 | EtAlCl$_2$ - VOCl$_3$ | 78 |
| 4 | EtAlCl$_2$ - VCl$_4$ | 74 |
| 5 | EtAlCl$_2$ - MoCl$_3$ | 81 |
| 6 | EtAlCl$_2$ - WCl$_4$ | 68 |
| 7 | EtAlCl$_2$ - FeCl$_3$ | 76 |
| 8 | EtAlCl$_2$ - NiCl$_2$ | 61 |
| 9 | Et$_4$Al - TiCl$_4$ | 37 |

Referring to the Table, the molar ratio of alkylaluminum halide to metal halogenide was fixed at 2:1 and the concentration of catalyst in the reaction system was such that the amount of alkylaluminum halide was 2/100 mol based on the combined weight of monomers present.

EXAMPLE 16

130g of isoprene, 30g of 1,3-pentadiene and 0.8g of p-tert-butylcalechole were placed in a 300cc autoclave and stirred at 200°C for 3 hours under continuous supply of nitrogen and thereafter the reaction product was transferred into a distillation flask, in which it was distilled off the non-reactive monomers by reduced-pressure (60 mmHg). As a result, 117g (73%) of monomers having boiling points of 70°– 95°C were obtained.

Analysis of these monomers by means of the GLC analysis method gave the following results:

| | |
|---|---|
| Homodimer of isoprene | 83% |
| Homodimer of 1,3-pentadiene | 14% |
| Codimer of isoprene-1,3-pentadiene | 3% |

Next 80g of the above monomers were polymerized using anhydrous aluminum chloride as the catalyst by the same method as that of Example 1. As a result, 56.8g (71%) of resin was obtained.

The resin thus obtained was found to have a softening point of 111°C, a molecular weight of 865, a specific gravity of 0.989 and a hue of 2G.

EXAMPLE 17

The monomers were polymerized by the same method as that of Example 16 except that the mixing ratios of isoprene and 1,3-pentadiene were changed as shown in Table 8.

of the film of tackifier. The length of the ball's travel on the tackifier surface was measured.

Adhesive strength:

A 1-kg press roller was used to stick strip of cellophane tape 15 mm in width to the stainless steel plate having the said pressure sensitive adhesive spread thereon. On a tensilon tensile tester, the tape was pulled at a rate of 300 mm/min until it was peeled off at an angle of 180°. The meter reading of load at the time of peeling was obtained.

Cohesive strength:

A 1-kg press roll was used to stick test piece having the said pressure sensitive adhesive spread thereon to a bonding area 5 mm × 15 mm. On a tensilon tensile tester, the test piece was pulled at a constant rate of 5 mm/min to determine cohesive strength.

For comparative purpose, a pressure sensitive adhesive was prepared by the same procedure using terpene resin (Picolite S) which is currently rated to be best among all commercially available products. This pressure sensitive adhesive was subjected to similar tests. The results are also shown in Table 9.

Table 9

| Resin | Initial tackifying property (cm) | Adhesive strength (g) | Cohesive strength (g) |
|---|---|---|---|
| Example 9, Run No. 4 | 8.0 | 750 | 1,100 |
| Example 10 | 8.1 | 710 | 1,020 |
| Example 14 | 8.0 | 710 | 1,110 |
| Example 15 | 7.5 | 670 | 990 |
| Example 17 Run No. 2 | 7.4 | 660 | 970 |
| Example 17 Run No. 3 | 7.3 | 630 | 900 |
| Comparison Terpene resin (Picolite S-100) | 9.6 | 910 | 840 |
| Terpene resin (Picolite S-115) | 9.3 | 990 | 940 |

Table 8

| Run No. | Mixing ratio of raw material isoprene/1,3-pentadiene | Dimer composition | | | Resultant polymer | | | |
|---|---|---|---|---|---|---|---|---|
| | | Isoprene homodimer | 1,3-pentadiene homodimer | Isoprene-1,3-pentadiene co-dimer | Yield of resin(%) | Softening point (°C) | Molecular weight | Hue (G) |
| 1 | 90/10 | 92 | 6 | 2 | 75 | 118 | 869 | 2 |
| 2 | 70/30 | 71 | 19 | 10 | 64 | 103 | 874 | 2 |
| 3 | 50/50 | 54 | 18 | 28 | 51 | 89 | 737 | 3 |

COMPARATIVE TEST 1

A mix obtained by blending 6 parts by weight of natural rubber (Alma crepe 9400 cps) with 4 parts by weight of each resin shown in Table 9 was dissolved in 50 parts by weight of toluene to produce a pressure sensitive adhesive. This pressure sensitive adhesive was spread on a stainless steel plate to a thickness of 30 μ with an applicator, dried at 60°C for 1 hour under a reduced pressure, thereafter allowed to stand constantly at the temperature for 12 hours and subjected to the following test.

Initial tackifying property:

A testing apparatus PSTC-18 was used. The inclined plate was adjusted to an angle of 30° and the stainless steel plate covered with the film of tackifier was placed horizontally at the base of the inclined plate. A steel ball 20 mm in diameter was allowed to roll down the inclined plate over a distance of 10 cm from its base line. The inertia caused the ball to roll along the surface

COMPARATIVE TEST 2

In 760 parts of toluene were dissolved 100 parts of natural rubber (crepe No. 1), 70 parts of each resin indicated in Table 10 and 20 parts of polybutene (HV 100), to prepare pressure sensitive adhesives.

The above-mentioned adhesives were spread to a thickness of 25 μ on a polyproprene film. These pressure sensitive adhesives were tested for initial tackifying property, adhesive strength and cohesive strength.

For the purpose of comparison, limonene resin was similarly treated to produce a pressure sensitive adhesive, which was subjected to the same test. The results were as indicated in Table 10.

Initial tackifying property

The initial tackifying property was determined on J. Dow's Method, which is as follows:

Adhesive tape is laid on an inclined plane making an angle of 30°C to the horizontal, along the line of the steepest slope. The adhesive strip is divided into three zones each of length 10cm. The upper and lower zones are rendered non-adhesive by any suitable means such as applying a strip of paper to the adhesive surface.

There remains a control adhesive zone of length 10cm. In order to measure the tack of a particular tape a series of steel ball bearings of various sizes (for example, from one-sixteenth inch to 1 inch in steps of one-thirtysecond inch diameters) are placed in turn on the upper limit of the top non-adhesive zone and allowed to fall down this zone and cross the adhesive zone. The tack number is taken to be the diameter in units of one-thirtysecond inch of the longest ball bearing retained by the adhesive zone.

Adhesive strength:

A 2-kg press roller was used to stick polyproprene film to the stainless steel plate having the pressure sensitive adhesive spread thereon. The film was pulled at a rate of 50 mm/min until it was peeled off at an angle of 180°.

Cohesive strength:

A 2-kg press roller was used to stick two polyproprene films having the pressure sensitive adhesive spread thereon to a bonding area 1 cm × 2.5 cm. The two films were pulled at a rate of 50 mm/min until they were peeled off to determine cohesive strength.

Table 10

| Resin | Initial tackifying property (ball No.) | Adhesive strength g/20 mm) | Cohesive strength (kg/25 mm) |
|---|---|---|---|
| Example 1 | 21 | 248 | 4,890 |
| Example 3 | 17 | 210 | 5,250 |
| Example 4 Run No. 8 | 23 | 315 | 3,910 |
| Example 4 Run No. 7 | 30 | 269 | 3,820 |
| Example 6 Run No. 7 | 22 | 263 | 4,780 |
| Example 6 Run No. 12 | 18 | 290 | 4,490 |
| Example 8 Run No. 2 | 19 | 317 | 4,050 |
| Example 8 Run No. 4 | 30 | 305 | 3,970 |
| Example 10 | 16 | 212 | 5,150 |
| Example 11 Run No. 1 | 22 | 198 | 4,930 |
| Example 11 Run No. 4 | 21 | 207 | 3,890 |
| Example 13 | 21 | 261 | 4,660 |
| Comparison Limonene resin | 30 | 280 | 3,750 |

COMPARATIVE TEST 3

In 500 parts of toluene were dissolved 100 parts of synthetic rubber (cis-1,4-polyisoprene) and 75 parts of each resin indicated in Table 11. The resultant solution was spread to a thickness of 50 μ on a sheet of kraft paper. The pressure sensitive adhesive thus formed was tested for tackifying properties. Other pressure sensitive adhesives prepared similarly from commercially available resins were tested for their properties. These properties are compared in Table 11.

Initial tackifying property and adhesive strength are determined on the same method as used in Comparative Test 2.

Hold Valne:

A half-inch strip of tape was attached to a half-inch by half-inch bar to provide a contact area of one-half-inch square. The bar was then positioned so that the adhered tape was 20°C from the vertical with the adhered portion on the underside of the bar and the free end hanging down. A 400g weight was suspended from the free end of the tape. The time in minutes that the tape supported the weight is recorded as the hold.

Table 11

| Resin | Viscosity of solution at 25°C × 1000 | Initial tackifying property (ball No.) | Adhesive strength (g/cm) | Hold value (hr) |
|---|---|---|---|---|
| Example 3 | 69 | 10 | 390 | 20.4 |
| Example 10 | 54 | 19 | 320 | 14.6 |
| Comparison Terpene resin (Polytack K-115) | 92 | 20 | 360 | 14.9 |
| Aliphatic petrolic resin (Alcon P-115) | 67 | 16 | 350 | 13.6 |
| Aliphatic petrolic resin (Hilets T-100X) | 58 | 9 | 310 | 9.3 |

COMPARATIVE TEST 4

In a 300-cc stainless steel beaker, 70g of the resin prepared in Example 10 and 20g of microcrystalline wax were placed and heated with stirring until they were dissolved thoroughly. To the completely dissolved mixture was added 110g of ethylene vinyl acetate polymer. After heating with stirring to about 320°C, the mixture was allowed to stand at rest in a hot-air drier kept at 180°C to remove froth. A film 1 mm in thickness was produced from this mixture by means of an applicator. Films were similarly formed by using commercially available resins. These films were compared. The results were as shown in Table 12.

Referring to the Table, the cold cracking temperature was obtained by cooling a film 2 mm in width in methanol-dry ice, bending the film from time to time and finding the temperature at which the film was finally broken along the bent portion. The pell strength was determined by causing the two surfaces of a given film to adhere to an aluminum plate and to a canvas and then finding the strength with which the film was peeled off at 50°C. The values of the tensile strength and those of the elongation given in the Table were obtained by subjecting a film 1 mm in thickness to tensile test at a constant load rate of 40 mm/min at 20°C. The viscosity was determined by means of a viscosimeter of BH type.

Table 12

| Resin | Cold cracking temperature (°C) | Peel Strength at 50°C (kg/25 mm) | Tensil strength (kg/cm²) | Elongation (%) | Softening point (°C) | Viscosity at 180°C CPS |
|---|---|---|---|---|---|---|
| Example 10 | −8 | 1.78 | 40.4 | 420 | 94 | 5,500 |
| Comparison Terpene resin (ECR-5) | −5 | 2.21 | 43.7 | 453 | 95 | 5,400 |
| Aliphatic petrolic resin (Alcon P-100) | +5 | 1.87 | 48.2 | 287 | 92 | 4,400 |
| Rosin ester resin (Pensel A) | 0 | 2.70 | 36.3 | 510 | 96 | 4,700 |

As is apparent from the table above, the resin used in this example showed excellent low-temperature properties suitable for packages for frozen food.

COMPARATIVE TEST 5

A 20-g portion of the resin prepared in Example 10 was allowed to react with 1g of maleic anhydride added thereto at 200°C for 5 hours. A 9-g portion of the resultant maleinic compound was dissolved by heating in conjunction with 1g of gum rosin added thereto. The solution was saponified with 20% aqueous solution of potassium hydroxide. On termination of the reaction, a sizing agent containing 24% of solids was prepared by adding 100 ml of water to the reaction product.

By using this sizing agent, beaten pulp (L-BKP) was shaped to the form of paper, with the pH value adjusted to 5.0 with aluminum sulfate. The paper was dried at 125°C for five minutes and tested for degree of sizing by Stochigt process (JIS P-8122). The same test was repeated by using commercially available aliphatic petrolic resins. The results thus obtained are compared with those obtained of the resin of this invention in Table 13.

Table 13

| Amount of sizing agent added (%) | 0.35 | 0.50 |
|---|---|---|
| Sizing solution according to the present invention | 2.5 second | 8.1 second |
| Comparison Sizing solution prepared from aliphatic petrolic resin | 1.6 second | 5.4 second |

COMPARATIVE TEST 6

Each resin shown in Table 14 and limonene resin were treated at 150°C for 20 hours.

Loss and hue on heating of each resin treated are shown in Table 14.

Table 14

| Resin | Loss (%) | Hue (G) |
|---|---|---|
| Example 1 | 1.67 | 1.5 → 3.0 |
| Example 3 | 0.01 | 2.0 → 3.0 |
| Example 4 | — | 2.5 → 3.0 |
| Example 6 | 0.04 | 3.0 → 4.0 |
| Comparison Limonene resin | 3.34 | 2.0 → 4.5 |

What is claimed is:

1. A tackifying resin having a softening point of from 74°–140°C. and an average molecular weigth of 750–1,300, obtained by catalytically polymerizing a mixture comprising 20 – 40% of 1,4-dimethyl-4-vinyl-1-cyclohexene, 20 – 40% of 2-methyl-4-isopropenyl-1-cyclohexane, 20 – 40% of 1-methyl-4-isopropenyl-1-cyclohexane, 5 – 10% of 1,5-dimethyl-1,5-cyclooctadiene plus 2,5-dimethyl-1,5-cyclooctadiene, and 1 – 3% of trans-1,2-dimethyl-1,2-divinylcyclobutane, trans-isopropenyl-2-methyl-2-vinylcyclobutane plus trans-1,2-diisopropenyl-cyclobutane, the catalyst being at least one member selected from the group consisting of aluminum chloride, aluminum chloride complex, aluminum tribromide, boron trifluoride, zirconium chloride, titanium tetrachloride, aluminum chloride-ferric chloride, aluminum chloride-titanium tetrachloride and aluminum chloride-aluminum bromide.

2. A tackifying resin having a softening point of from 74° – 140°C. and an average molecular weight of 750–1,300, obtained by catalytically polymerizing a mixture comprising 20 – 40% of 1,4-dimethyl-4-vinyl-1-cyclohexene, 20 – 40% of 2-methyl-4-isopropenyl-1-cyclohexane, 20 – 40% of 1-methyl-4-isopropenyl-1-cyclohexane, 5 – 10% of 1,5-dimethyl-1,5-cyclooctadiene plus 2,5-dimethyl-1,5-cyclooctadiene, and 1 – 3% of trans-1,2-dimethyl-1,2-divinylcyclobutane, trans-isopropenyl-2-methyl-2-vinylcyclobutane plus trans-1,2-diisopropenyl-cyclobutane, the catalyst being of an organo metallic compound mixture represented by the generic formula $R_nMX_{3-n}$ wherein, R represents a hydrocarbon substituent having up to 18 carbon atoms, X denotes a halogen atom, M represents tin or aluminum and $n$ is 1, 1.5 or 2, and the halogenide of a metal from Groups III, IV, V, VI and VIII of the Periodic Table of Elements.

3. A tackifying resin having a softening point of from 65° – 135°C. and a molecular weight of 510 – 960, obtained by catalytically polymerizing a mixture which comprises 40 – 60% of co-dimers selected from the group consisting of 1-methyl-1,2-divinylcyclobutane, 4-methyl-4-vinylcyclohexene, 1-methyl-4(5)-vinylcyclohexene, 4-isopropenyl-cyclohexene, and 1-methyl-cyloocta-1,5-diene, and 40 – 60% of homo-dimers selected from the group consisting of 1,2-divinylcyclobutane, 1,2-dimethyl-1,2-divinylcyclobutane, 1-isopropenyl-2-methyl-2-vinylcyclobutane, 1,2-diisopropenylcyclobutane, 4-vinylcyclohexene, cycloocta-1,5-diene, 1,4-dimethyl-4-vinylcyclohexene, meta- and para-mentha-1,8-diene, 1,5- and 2,5-dimethyl-cycloocta-1,5-diene, the catalyst being at least one member selected from the group consisting of aluminum chloride, aluminum chloride complex, aluminum tribromide, boron trifluoride, zirconium chloride, titanium tetrachloride, aluminum chloride-ferric chloride, aluminum chloride-titanium tetrachloride and aluminum chloride-aluminum bromide.

4. A tackifying resin having a softening point of from 65° – 135°C. and a molecular weight of 510 – 960, obtained by catalytically polymerizing a mixture which comprises 40 – 60% of co-dimers selected from the group consisting of 1-methyl-1,2-divinylcyclobutane, 4-methyl-4-vinylcyclohexene, 1-methyl-4(5)-vinylcyclohexene, 4-isopropenyl-cyclohexene, and 1-methyl-cycloocta-1,5-diene, and 40 – 60% of homo-dimers selected from the group consisting of 1,2-divinylcyclobutane, 1,2-dimethyl-1,2-divinylcyclobutane, 1-isopropenyl-2-methyl-2-vinylcyclobutane, 1,2-diisopropenyl-cyclobutane, 4-vinylcyclohexene, cycloocta-1,5-diene, 1,4-dimethyl-4-vinylcyclohexene, meta- and para-mentha-1,8-diene, 1,5- and 2,5-dimethyl-cycloocta-1,5-diene, the catalyst being a mixture of an organo metallic compound represented by the generic formula $R_nMX_{3-n}$ wherein, R represents a hydrocarbon substituent having up to 18 carbon atoms, X denotes a halogen atom, M represents tin or aluminum and $n$ is 1, 1.5 or 2, and the halogenide of a metal from groups III, IV, V, VI and VIII of the Periodic Table of Elements.

5. A tackifying resin having a softening point of from 89° – 118°C. and a molecular weight of 730 – 930, obtained by catalytically polymerizing a mixture which comprises 40 – 90% of isoprene dimers selected from the group consisting of 1,2-dimethyl-1,2-divinyl-cyclobutane, 1-methyl-1-vinyl-2-isopropenyl cyclobutane, 1,2-diisopropenyl cyclobutane, 1,4-dimethyl-4-vinylcyclohex-6-ene, 1-methyl-3-isopropenyl-cyclohex-6-ene, 1-methyl-4-isopropenyl-cyclohex-6-ene, 1,5-dimethyl-1,5-cyclooctadiene, and 2,5-dimethyl-1,5-cyclooctadiene, 5 – 20% of 1,3-pentadiene dimers selected from the group consisting of 1-methyl-2-vinyl-3-propenyl-cyclobutane, 1,2-propeyl-cyclobutane, 1,2-dimethyl-3-vinyl-cyclohex-5-ene, 1,3-dimethyl-2-vinyl-cyclohex-5-ene, 1-methyl-2-propeyl-cyclohex-5-ene, 1-methyl-3-propenyl-cyclohex-5-ene, 3,4-dimethyl-1,5-cyclooctadiene, and 2 – 30% of codimers selected from the group consisting of isoprene-1,3-pentadiene as 1-methyl-1-vinyl-2-propenyl-cyclobutane, 1-isopropenyl-cyclobutane, 1,2-dimethyl-3-vinyl-cyclohex-6-ene, 1,3-dimethyl-2-vinyl-cyclohex-6-ene, 1-methyl-3-propenyl-cyclohex-6-ene, 1-methyl-4-propenyl-cyclohex-6-ene, and 1,4-dimethyl-1,5-cyclooctadiene, the catalyst being at least one member selected from the group consisting of aluminum chloride, aluminum chloride complex, aluminum tribromide, boron trifluoride, zirconium chloride, titanium tetrachloride, aluminum chloride-ferric chloride, aluminum chloride-titanium tetrachloride and aluminum chloride aluminum bromide.

6. A tackifying resin having a softening point of from 89° – 118°C. and a molecular weight of 730 – 930, obtained by catalytically polymerizing a mixture which comprises 40 – 90% of isoprene dimers selected from the group consisting of 1,2-dimethyl-1,2-divinyl-cyclobutane, 1-methyl-1-vinyl-2-isopropenyl cyclobutane, 1,2-diisopropenyl cyclobutane, 1,4-dimethyl-4-vinyl-cyclohex-6-ene, 1-methyl-3-isopropenyl-cyclohex-6-ene, 1,5-dimethyl-1,5-cyclooctadiene, and 2,5-dimethyl-1,5-cyclooctadiene, 5 – 20% of 1,3-pentadiene dimers selected from the group consisting of 1-methyl-2-vinyl-3-propenyl-cyclobutane, 1,2-propeyl-cyclobutane, 1,2-dimethyl-3-vinyl-cyclohex-5-ene, 1,3-dimethyl-2-vinyl-cyclohex-5-ene, 1-methyl-2-propeyl-cyclohex-5-ene, 1-methyl-3-propenyl-cyclohex-5-ene, 3,4-dimethyl-1,5-cyclooctadiene, and 2 – 30% of codimers selected from the group consisting of isoprene-1,3-pentadiene as 1-methyl-1-vinyl-2-propenyl-cyclobutane, 1-isopropenyl-2-propenyl-cyclobutane, 1,2-dimethyl-3-vinyl-cyclohex-6-ene, 1,3-dimethyl-2-vinyl-cyclohex-6-ene, 1-methyl-3-propenyl-cyclohex-6-ene, 1-methyl-4-propenyl-cyclohex-6-ene, and 1,4-dimethyl-1,5-cyclooctadiene, the catalyst being a mixture of an organo metallic compound represented by the generic formula $R_nMX_{3-n}$ wherein, R represents a hydrocarbon substituent having up to 18 carbon atoms, X denotes a halogen atom, M represents tin or aluminum and $n$ is 1, 1.5 or 2, and the halogenide of a metal from Groups III, IV, V, VI and VIII of the Periodic Table of Elements.

* * * * *